United States Patent
Sen et al.

(10) Patent No.: US 12,127,283 B2
(45) Date of Patent: Oct. 22, 2024

(54) METHOD AND APPARATUS FOR OPTIMIZING SERVICE DELIVERY OPERATING IN EN-DC MODE

(71) Applicant: Samsung Electronics Co., Ltd., Suwon-si (KR)

(72) Inventors: Arijit Sen, Bengaluru (IN); Koustav Roy, Bengaluru (IN); Manasi Ekkundi, Bengaluru (IN); Jagadeesh Gandikota, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 17/621,820

(22) PCT Filed: Jul. 3, 2020

(86) PCT No.: PCT/KR2020/008763
§ 371 (c)(1),
(2) Date: Dec. 22, 2021

(87) PCT Pub. No.: WO2021/002731
PCT Pub. Date: Jan. 7, 2021

(65) Prior Publication Data
US 2022/0248488 A1 Aug. 4, 2022

(30) Foreign Application Priority Data

Jul. 3, 2019 (IN) .......................... 2019 41026709
Jun. 23, 2020 (IN) .......................... 201941026709

(51) Int. Cl.
*H04W 76/15* (2018.01)
*G01S 5/02* (2010.01)
(Continued)

(52) U.S. Cl.
CPC ........... *H04W 76/15* (2018.02); *G01S 5/0236* (2013.01); *H04W 24/10* (2013.01); *H04W 28/06* (2013.01);
(Continued)

(58) Field of Classification Search
CPC ... H04W 24/10; H04W 36/0055–0094; H04W 36/0069; H04W 36/00698;
(Continued)

(56) References Cited

U.S. PATENT DOCUMENTS 10,117,139 B1   10/2018  Shahi et al.
11,516,810 B1 *  11/2022  Mohammed .......... H04L 5/0032
(Continued)

FOREIGN PATENT DOCUMENTS

KR  10-2018-0027305 A  3/2018

OTHER PUBLICATIONS

International Search Report and Written Opinion of the International Searching Authority dated Oct. 13, 2020, in connection with International Application No. PCT/KR2020/008763, 9 pages.
(Continued)

*Primary Examiner* — Brendan Y Higa

(57) ABSTRACT

In an example embodiment, a method of optimizing service delivery performed by a UE operating in EN-DC mode is disclosed. The method comprises detecting that a network service is ongoing at the UE using a first radio access technology (RAT), based on an application request sent by the UE to a network, wherein the first RAT is one of long-term evolution (LTE) and NR. The method further comprises detecting, during the ongoing network service being availed using the first RAT, a frequency of one or more NR network procedures being performed by the UE to be greater than a first threshold frequency. The method further comprises modifying a measurement interval associated
(Continued)

with an NR cell measurement procedure, in response to detecting the frequency of the NR network procedures to be greater than the first threshold frequency. Furthermore, the method comprises continuing the Network Service using the first RAT.

15 Claims, 5 Drawing Sheets

(51) Int. Cl.
H04W 24/10 (2009.01)
H04W 28/06 (2009.01)
H04W 36/00 (2009.01)

(52) U.S. Cl.
CPC . H04W 36/00698 (2023.05); H04W 36/0088 (2013.01)

(58) Field of Classification Search
CPC ... H04W 36/0085–0094; H04W 76/15; H04W 88/06
See application file for complete search history.

(56) References Cited

U.S. PATENT DOCUMENTS

| | | | |
|---|---|---|---|
| 11,671,887 B2* | 6/2023 | Chin | H04W 36/0033 370/331 |
| 2013/0104173 A1* | 4/2013 | Tjio | H04N 21/6131 725/62 |
| 2014/0364128 A1* | 12/2014 | Lee | H04W 36/18 455/442 |
| 2017/0156174 A1 | 6/2017 | Chaponniere et al. | |
| 2018/0069606 A1 | 3/2018 | Jung et al. | |
| 2020/0059941 A1* | 2/2020 | Belghoul | H04W 72/542 |
| 2020/0068638 A1* | 2/2020 | Au | H04W 24/02 |
| 2020/0323005 A1* | 10/2020 | Chin | H04W 76/27 |
| 2020/0344694 A1* | 10/2020 | Jangid | H04W 64/003 |
| 2023/0422130 A1* | 12/2023 | Chin | H04B 17/328 |

OTHER PUBLICATIONS

Huawei et al., "Measurement Exception for s-Measure in LTE," R2-1805303 Revision of R2-1803253, 3GPP TSG-RAN WG2 Meeting #101bis, Sanya, China, Apr. 16-20, 2018, 13 pages.

Mediatek Inc., "SSTD Design in EN-DC," R2-1800972, 3GPP TSG-RAN WG2 Meeting AH-1801, Vancouver, Canada, Jan. 22-26, 2018, 32 pages.

* cited by examiner

METHOD AND APPARATUS FOR OPTIMIZING SERVICE DELIVERY OPERATING IN EN-DC MODE

CROSS-REFERENCE TO RELATED APPLICATIONS

This application is a 371 of International Application No. PCT/KR2020/008763, filed Jul. 3, 2020, which claims priority to Indian Patent Application No. 201941026709, filed Jul. 3, 2019, and Indian Patent Application No. 201941026709, filed Jun. 23, 2020, the disclosures of which are herein incorporated by reference in their entirety.

BACKGROUND

1. Field

The present disclosure, in general, relates to optimizing service delivery at a UE, and, in particular, relates to optimizing service delivery at a UE operating in an evolved universal terrestrial radio access network (E-UTRAN) new radio (NR)-dual connectivity (EN-DC) mode.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as a technonologyed connectivity network where humans generate and consume information, is now evolving to the Internet of things (IoT) where ud server, has emeIoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to provide a method and apparatus for optimizing service delivery operating in EN-DC mode.

Another object of the embodiments herein is to detect that a network service is ongoing at the UE using a first radio access technology (RAT), based on an application request sent by the UE to a network, wherein the first RAT is one of long-term evolution (LTE) and NR.

Another object of the embodiments herein is to detect, during the ongoing network service being availed using the first RAT, a frequency of one or more NR network procedures being performed by the UE to be greater than a first threshold frequency.

Another object of the embodiments herein is to modify a measurement interval associated with an NR cell measurement procedure, in response to detecting the frequency of the one or more NR network procedures to be greater than the first threshold frequency.

Another object of the embodiments herein is to continue the Network Service using the first RAT.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
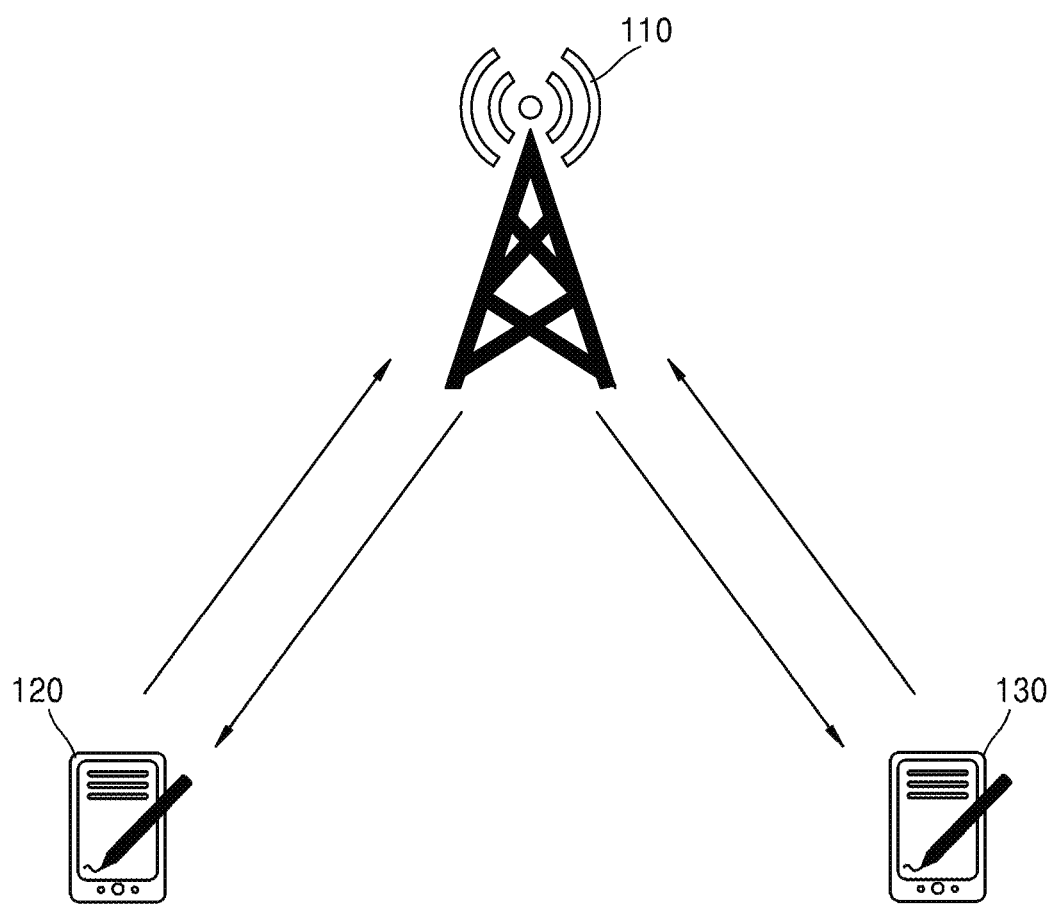
FIG. 1 illustrates a wireless communication system according to one or more embodiments of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

Accordingly, the embodiments herein provide a method A method of optimizing service delivery at a UE operating in an EN-DC mode. The method comprises detecting that a network service is ongoing at the UE using a first radio access technology (RAT), based on an application request sent by the UE to a network, the first RAT is one of LTE and NR, detecting, during the ongoing network service being availed using the first RAT, a frequency of one or more NR network procedures being performed by the UE to be greater than a first threshold frequency, modifying a measurement interval associated with an NR cell measurement procedure, in response to detecting the frequency of the one or more NR network procedures to be greater than the first threshold frequency, and continuing the Network Service using the first RAT.

In an embodiment, modifying of the measurement interval comprises, increasing a current value of the measurement interval by a pre-set time value for each instance of the frequency of the one or more NR network procedures crossing the first threshold frequency.

In an embodiment, the method further comprises sending a message indicative of non-support of NR to the network when a number of instances exceeds a threshold number of instances, and performing one of: continuing the network service using the first RAT, if the first RAT is LTE and terminating the connection to the NR and continuing the network service over LTE if the first RAT is NR.

In an embodiment, the method further comprises determining a current location of the UE, ascertaining whether an identifier of the determined location is present in a location database comprising of one or more identifiers corresponding to one or more locations where at least one of the UE and one or more other UEs have experienced interference in the network service due to the frequency of the one or more NR network procedures, the location database is stored in at least one of the UE and a network node, and storing the identifier associated with the determined location in the location database, if it is ascertained that the location identifier corresponding to the determined location is not present in the location database.

In an embodiment, the further comprises determining a current location of the UE to be an interference location based on at least one of: a location database comprising information associated with one or more locations where at least one of the UE and one or more other UEs have experienced interference in the network service due to the frequency of the one or more NR network procedures, the location database is stored in at least one of the UE and a network node, historic measurement data associated with the determined current location, the historic measurement data comprises previously recorded frequency of NR procedures performed by at least one of the UE or one or more other UEs at the current location, and a value of a plurality of network parameters at the current location of the UE, the plurality of network parameters comprises a B1 threshold configured by the network, beam reference signal received power (RSRP), beam reference signal received quality (RSRQ), signal-to-interference-plus-noise ratio (SINR), a path loss value, a transmission power (Tx) of the UE, and a maximum transmit power level (MTPL) of the UE, sending a message indicative of non-support of the NR to the network, in response to the current location being determined as an interference location, performing one of: continuing the network service using the first RAT, if the first RAT is LTE, and terminating the connection to the NR and continuing the network service over LTE if the first RAT is NR.

In an embodiment, the message indicative of non-support of the NR cell comprises one of a tracking area update (TAU) message and an attach message.

In an embodiment, the method further comprises detecting a change in the current location of the UE, determining the changed location of the UE to be a non-interference location based on at least one of: the location database, the historic measurement data, and the plurality of network parameters, and sending a request to the network to connect to the NR, in response to determining that the changed location is the non-interference location.

In an embodiment, the method further comprises monitoring a status of the network service, detecting completion of the network service based on the monitored status of the network service, and sending a request to the network to connect to the NR cell upon detecting the completion of the network service.

In an embodiment, the network service comprises at least one of a voice over LTE VoLTE, a video call, a video streaming session, a voice over new radio (VoNR), a video conference session, and a data session.

In an embodiment, the one or more NR network procedures comprises at least one of an NR addition and an NR removal, and the frequency of the one or more NR network procedures comprises of the number of times the NR cell is added and removed.

In an embodiment, the method further comprises calculating a loss function based on a current frequency of the NR procedures and the first threshold frequency, and modifying the first threshold frequency based on the loss function, the modification comprises one of increasing and decreasing the first threshold frequency.

Accordingly, the embodiments herein provide the UE operating in an EN-DC mode. The UE comprises a communication circuit, a storage, and a controller coupled to the communication circuit and the storage, the controller is configured to: detect that a network service is ongoing at the UE using a first RAT, based on an application request sent by the UE to a network, the first RAT is one of LTE and NR, detect, during the ongoing network service being availed using the first RAT, a frequency of one or more NR network procedures being performed by the UE to be greater than a first threshold frequency, modify a measurement interval associated with an NR cell measurement procedure, in response to detecting the frequency of the one or more NR network procedures to be greater than the first threshold frequency, and continue the Network Service using the first RAT.

In an embodiment, the modifying of the measurement interval comprises, the controller is further configured to increase a current value of the measurement interval by a pre-set time value for each instance of the frequency of the one or more NR network procedures crossing the first threshold frequency.

In an embodiment, the controller is further configured to: send a message indicative of non-support of NR to the network when a number of instances exceeds a threshold number of instances, perform one of: continue the network service using the first RAT, if the first RAT is LTE, and terminate the connection to the NR and continuing the network service over LTE if the first RAT is NR.

In an embodiment, the controller is further configured to: determine a current location, ascertain whether an identifier of the determined location is present in a location database comprising of one or more identifiers corresponding to one or more locations where at least one of the UE and one or more other UEs have experienced interference in the network service due to the frequency of the one or more NR network procedures, the location database is stored in at least one of the UE and a network node, and store the identifier associated with the determined location in the location database, if it is ascertained that the location identifier corresponding to the determined location is not present in the location database.

In an embodiment, the controller is further configured to: determine a current location of the UE to be an interference location based on at least one of: a location database comprising information associated with one or more locations where at least one of the UE and one or more other UEs have experienced interference in the network service due to the frequency of the one or more NR network procedures, the location database is stored in at least one of the UE and a network node, historic measurement data associated with the determined current location, the historic measurement data comprises previously recorded frequency of NR procedures performed by at least one of the UE or one or more other UEs at the current location, and a value of a plurality of network parameters at the current location of the UE, the plurality of network parameters comprises a B1 threshold configured by the network, beam RSRP, beam RSRQ, SINR, a path loss value, a Tx of the UE, and a MTPL of the UE, send a message indicative of non-support of the NR to the network, in response to the current location being determined as an interference location, and perform one of: continue the network service using the first RAT, if the first RAT is LTE, and terminate the connection to the NR and continuing the network service over LTE if the first RAT is NR.

In an embodiment, the message indicative of non-support of the NR cell comprises one of a tracking area update (TAU) message and an attach message.

In an embodiment, the controller is further configured to: detect a change in the current location of the UE, determine the changed location of the UE to be a non-interference location based on at least one of: the location database, the historic measurement data, and the plurality of network parameters, and send a request to the network to connect to the NR, in response to determining that the changed location is the non-interference location.

In an embodiment, the controller is further configured to: monitor a status of the network service, detect completion of the network service based on the monitored status of the network service, and send a request to the network to connect to the NR cell upon detecting the completion of the network service.

In an embodiment, the network service comprises at least one of a VoLTE, a video call, a video streaming session, a VoNR, a video conference session, and a data session.

In an embodiment, the one or more NR network procedures comprises at least one of an NR addition and an NR removal, and the frequency of the one or more NR network procedures comprises of the number of times the NR cell is added and removed.

In an embodiment, the controller is further configured to: calculate a loss function based on a current frequency of the NR procedures and the first threshold frequency, and modify the first threshold frequency based on the loss function, the modification comprises one of increasing and decreasing the first threshold frequency.

Accordingly, the embodiments herein provide a method of optimizing service delivery provided to a UE operating in an EN-DC mode, the method comprises detecting that a network service is ongoing at the UE using a first RAT, based on an application request sent by the UE to a network, the first RAT is one of LTE and NR, detecting, during the ongoing network service being availed using the first RAT, a frequency of one or more NR network procedures being performed by the UE to be greater than a first threshold frequency, modifying one of: a measurement interval associated with an NR cell measurement procedure and a network parameter in a network reconfiguration message, in response to detecting the frequency of the one or more NR network procedures to be greater than the first threshold frequency, and continuing the Network Service using the first RAT.

In an embodiment, the network parameter is B1 threshold, and the method further comprises, increasing the B1 threshold by a pre-set value for each instance of the frequency of the one or more NR network procedures crossing the first threshold frequency.

In an embodiment, the modifying of the measurement interval comprises, increasing a current value of the measurement interval by a pre-set time value for each instance of the frequency of the one or more NR network procedures crossing the first threshold frequency.

In an embodiment, the method further comprises: terminating one or more NR bearers established between the UE and the network, when a number of the instances exceeds a threshold number, and performing one of: continuing the network service using the first RAT, if the first RAT is LTE, and continuing the network service over LTE, if the first RAT is NR.

In an embodiment, the method further comprises: determining a current location, ascertaining whether an identifier of the determined location is present in a location database comprising of one or more identifiers corresponding to one or more locations where at least one of the UE and one or more other UEs have experienced interference in the network service due to the frequency of the one or more NR network procedures, the location database is stored in at least one of the UE and a network node, and storing the identifier associated with the determined location in the location database, if it is ascertained that the location identifier corresponding to the determined location is not present in the location database.

In an embodiment, the method further comprises: determining a current location of the UE to be an interference location based on at least one of: a location database comprising information associated with one or more locations where at least one of the UE and one or more other UEs have experienced interference in the network service due to the frequency of the one or more NR network procedures, the location database is stored in at least one of the UE and a network node, historic measurement data associated with the determined current location, the historic measurement data comprises previously recorded frequency of NR procedures performed by at least one of the UE or one or more other UEs at the current location, and a value of a plurality of network parameters at the current location of the UE, the plurality of network parameters comprises a B1 threshold configured by the network, beam RSRP, beam RSRQ, SINR, a path loss value, a Tx of the UE, and a MTPL of the UE, terminating one or more NR bearers established between the UE and the network, in response to determining the current location of the UE to be the interference location, and performing one of: continuing the network service using the first RAT, if the first RAT is LTE, and continuing the network service over LTE, if the first RAT is NR.

In an embodiment, the method further comprises: detecting a change in the current location of the UE, determining the changed location of the UE to be a non-interference location based on at least one of: the location database, the historic measurement data, and the plurality of network parameters, and re-establishing the one or more NR bearers with the UE, in response to determining that the changed location to be the non-interference location.

In an embodiment, the method further comprises: monitoring a status of the network service, detecting completion of the network service based on the monitored status of the network service, and re-establishing the one or more NR bearers with the UE, in response to determining that the changed location to be the non-interference location.

In an embodiment, the network service comprises at least one of a VoLTE, a video call, a video streaming session, a VoNR, a video conference session, and a data session.

In an embodiment, the one or more NR network procedures comprises at least one of an NR addition and an NR removal, and the frequency of the one or more NR network procedures comprises of the number of times the NR cell is added and removed.

In an embodiment, the method further comprises: calculating a loss function based on a current frequency of the NR procedures and the first threshold frequency, and modifying the first threshold frequency based on the loss function, the modification comprises one of increasing and decreasing the first threshold frequency.

Accordingly, the embodiments herein provide a base station for optimizing service delivery provided to a UE operating in an EN-DC mode. The base station comprises: a communication circuit, a backhaul communication circuit, a storage, and a controller coupled to the communication circuit, the backhaul communication circuit, and the storage, the controller is configured to: detect that a network service is ongoing at the UE using a first RAT, based on an application request sent by the UE to a network, the first RAT is one of LTE and NR;
    detect, during the ongoing network service being availed using the first RAT, a frequency of one or more NR network procedures being performed by the UE to be greater than a first threshold frequency, modify one of: a measurement interval associated with an NR cell measurement procedure and a network parameter in a network reconfiguration message, in response to detecting the frequency of the one or more NR network procedures to be greater than the first threshold frequency, and continue the Network Service using the first RAT.

In an embodiment, the network parameter is B1 threshold, and the controller is further configured to increase the B1 threshold by a pre-set value for each instance of the frequency of the one or more NR network procedures crossing the first threshold frequency.

In an embodiment, modifying of the measurement interval comprises, the controller is further configured to increase a current value of the measurement interval by a pre-set time value for each instance of the frequency of the one or more NR network procedures crossing the first threshold frequency.

In an embodiment, the controller is further configured to: terminate one or more NR bearers established between the UE and the network, when a number of the instances exceeds a threshold number, and perform one of: continue the network service using the first RAT, if the first RAT is LTE, and continue the network service over LTE, if the first RAT is NR.

In an embodiment, the controller is further configured to: determine a current location of the UE, ascertain whether an identifier of the determined location is present in a location database comprising of one or more identifiers corresponding to one or more locations where at least one of the UE and one or more other UEs have experienced interference in the network service due to the frequency of the one or more NR network procedures, the location database is stored in at least one of the UE and a network node, and store the identifier associated with the determined location in the location database, if it is ascertained that the location identifier corresponding to the determined location is not present in the location database.

In an embodiment, the controller is further configured to: determine a current location of the UE to be an interference location based on at least one of: a location database comprising information associated with one or more locations where at least one of the UE and one or more other UEs have experienced interference in the network service due to the frequency of the one or more NR network procedures, the location database is stored in at least one of the UE and a network node, historic measurement data associated with the determined current location, the historic measurement data comprises previously recorded frequency of NR procedures performed by at least one of the UE or one or more other UEs at the current location, and a value of a plurality of network parameters at the current location of the UE, the plurality of network parameters comprises a B1 threshold configured by the network, beam RSRP, beam RSRQ, SINR, a path loss value, a Tx of the UE, and a MTPL of the UE, terminate one or more NR bearers established between the UE and the network, in response to determining the current location of the UE to be the interference location, and perform one of: continue the network service using the first RAT, if the first RAT is LTE, and continue the network service over LTE, if the first RAT is NR.

In an embodiment, the controller is further configured to: detect a change in the current location of the UE, determine the changed location of the UE to be a non-interference location based on at least one of: the location database, the historic measurement data, and the plurality of network parameters, and re-establish the one or more NR bearers with the UE, in response to determining that the changed location to be the non-interference location.

In an embodiment, the controller is further configured to: monitor a status of the network service, detect completion of the network service based on the monitored status of the network service, and re-establish the one or more NR bearers with the UE, in response to determining that the changed location to be the non-interference location.

In an embodiment, the network service comprises at least one of a VoLTE, a video call, a video streaming session, a VoNR, a video conference session, and a data session.

In an embodiment, the one or more NR network procedures comprises at least one of an NR addition and an NR removal, and the frequency of the one or more NR network procedures comprises of the number of times the NR cell is added and removed.

In an embodiment, the controller is further configured to: calculate a loss function based on a current frequency of the NR procedures and the first threshold frequency, and modify the first threshold frequency based on the loss function, the modification comprises one of increasing and decreasing the first threshold frequency.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

For promoting an understanding of the principles of the present disclosure, reference will now be made to the embodiment illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this specification to "an aspect," "another aspect" or similar language means that a particular feature, structure, or characteristic described in connection with the embodiment is included in at least one embodiment of the present disclosure. Thus, appearances of the phrase "in an embodiment," "in another embodiment" and similar language throughout this specification may, but do not necessarily, all refer to the same embodiment.

The terms "comprises," "comprising," or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which the present disclosure belongs. The system, methods, and examples provided herein are illustrative only and not intended to be limiting.

With advancement in communication technology and specifications pertaining to wireless communication technologies, wireless communication networks and User Equipment/wireless terminal, such as smartphones and tablets, have been adapted to support dual connectivity between User Equipment and wireless networks. As an example, in non-standalone (NSA) deployment of 5G, a UE may operate in an EN-DC mode, and may support network connection to both LTE network and NR network.

With the advancement and evolution of wireless network technologies, such as 4G and 5G, several new procedures have been proposed or are being implemented to manage and optimize network resources with respect to a UE connected to such a network.

In the EN-DC mode, the UE may avail network services, such as a VoLTE call, a data session, a video conferencing session, a video call, a VoNR call, and the like, using either of the LTE or NR network, as the case may be. For instance, a VoLTE call may be completed over LTE network, whereas a data session may be availed over NR due to the comparatively better data speeds being offered by NR.

During field tests and other network scenarios, it has been observed that improper utilization of network resources occurs, or user experience is degraded. For instance, there have been scenarios where a UE, which is not permitted to access 5G or NR services, is still able to attach to NR and avail said services. Similarly, certain reconfiguration scenarios result in VoLTE call drops. Certain conditions also result in data stall in 5G. This, in turn, results in degraded user experience. Thus, there is a need for a solution that overcomes the above deficiencies.

In an example, when the UE is availing these network services, there may occur a scenario where the UE is in a region with weak NR coverage or network conditions may degrade, for reasons such as mobility, etc. This, in turn, may cause frequent NR addition and removal. In some network implementations, in such scenarios the network triggers intra cell handover as a data recovery approach due to which an LTE random access channel (RACH) procedure is initiated after every NR addition/NR removal.

In an example where the UE is in a VoLTE call, each procedure of NR addition and NR removal, that is accompanied by an LTE RACH procedure, may cause interference in the VoLTE call. For example, a packet drop in the VoLTE call may occur or a VoLTE call mute may be observed. In another example where the UE is in a data session over the NR leg, again the NR additions and NR removals that are accompanied by the LTE RACH may result in temporary or permanent data stall. The situation worsens in a region where the LTE network is also weak. For instance, in such regions, the LTE RACH may also succeed after some number of trials. Accordingly, the VoLTE mute or data stall may be observed for greater duration, or in worst case scenario, the network service may get terminated only.

The present disclosure aims to address at least one of the aforementioned deficiencies and provides methods, UE, and network nodes to optimize service delivery at UE, according to one or more embodiments. Embodiments of the present disclosure will be described below in detail with reference to the accompanying drawings.

FIG. 1 illustrates a wireless communication system according to an embodiment of the present disclosure. More particularly, FIG. 1 illustrates a base station 110, a terminal 120, and a terminal 130 as some of nodes that use a wireless channel in a wireless communication system. Although a single base station is illustrated in FIG. 1, another base station that is the same as, or different from, the base station 110 may be further included. Embodiments of the wireless communication system may include one or more terminals, such as the terminals 120 and 130, and one or more radio network nodes, such as the base station 110, capable of communicating with the terminals 120 and 130. The wireless communication system may also include any additional elements suitable to support communication between terminals 120 and 130 or between a terminal, such as the terminal 120, and another communication device (such as a landline telephone).

The base station 110 may be a network infrastructure that provides radio access to the terminals 120 and 130. The base station 110 may have coverage defined by a predetermined geographic area based on a distance to which the base station 110 is capable of transmitting a signal. The base station 110 may be referred to as "access point (AP)," "eNodeB (eNB)," "gNodeB (gNB)," "5th generation node (5G node)," "wireless point," "transmission/reception point (TRP)," or other terms having equivalent technical meaning, in addition to "base station."

In an example, each of the terminal 120 and the terminal 130 is a device used by a user, and may perform communication with the base station 110 via a wireless channel. Depending on the case, at least one of the terminals 120 and 130 may operate irrespective of handling by a user. That is, at least one of the terminals 120 and the terminal 130 may be a device that performs machine type communication (MTC), and may not be carried by a user. Each of the terminal 120 and the terminal 130 may be referred to as "user equipment (UE)," "mobile station," "subscriber station," "remote terminal," "wireless terminal," "user device," or other terms having the equivalent technical meaning, in addition to "terminal."

In an example, a terminal may include any suitable combination of hardware and/or software. For example, in particular embodiments, a terminal, such as terminal 120, may include the components described with respect to FIG. 4 below. Similarly, a base station may include any suitable combination of hardware and/or software. For example, in particular embodiments, a base station, such as base station 110, may include the components described with respect to FIG. 5 below.

The base station 110, the terminal 120, and the terminal 130 may transmit and receive wireless signals in a millimeter wave (mmWave) band (e.g., 28 GHz, 30 GHz, 38 GHz, or 60 GHz). In this case, to improve a channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams via a beam search or beam management procedure. After the serving beams are selected, communication may be performed via resources that are in the quasi co-located (QCL) relationship with resources used for transmitting the serving beams.

According to an embodiment, the base station 110, the terminal 120, and the terminal 130 may transmit and receive wireless signals in a band other than the millimeter wave band. In other words, the band at which the base station 110, the terminal 120, and the terminal 130 transmit and receive wireless signals is not limited to the millimeter wave band. In this case, the base station 110, the terminal 120, and the terminal 130 may perform mutual communication without performing beamforming.

In an example, in the wireless communication system, the base station 110, the terminal 120, and the terminal 130 may use any suitable radio access technology, such as LTE, LTE-Advanced, UMTS, HSPA, GSM, cdma2000, NR, WiMax, WiFi, and/or other suitable radio access technology. In an example, the wireless communication system may include any suitable combination of one or more radio access technologies. For purposes of example, various embodiments may be described within the context of certain radio access technologies. However, the scope of the disclosure is not limited to the examples and other embodiments could use different radio access technologies.

Figure 2:
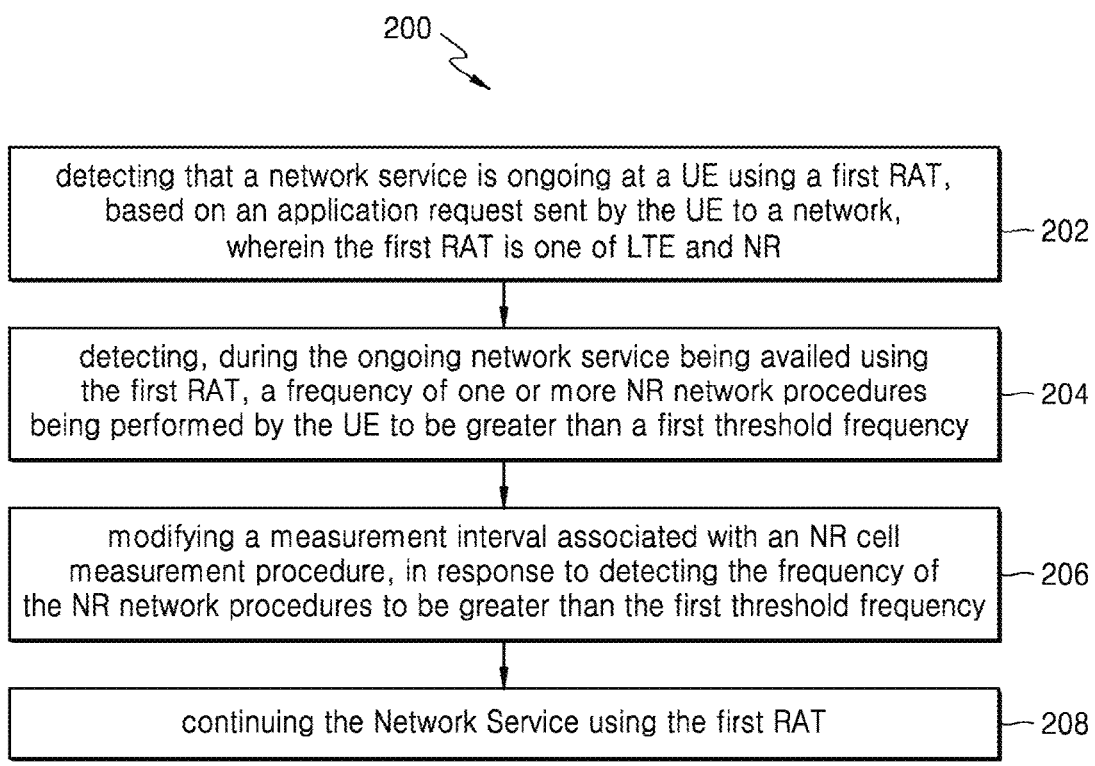
FIG. 2 illustrates a flowchart of a method of optimizing service delivery at a user equipment (UE) operating in an EN-DC mode according to an embodiment of the present disclosure.

FIG. 2 illustrates a method 200 of optimizing service delivery at a UE, such as the terminal 120 or 130, operating in an EN-DC mode, according to an embodiment of the present disclosure. In an example, aspects of the method 200, as described herein, may be implemented by one or more components of a terminal as illustrated and described in FIG. 4.

At step 202, the method 200 comprises detecting that a network service is ongoing at the UE using a first RAT, based on an application request sent to a network by the UE. In an example, the network service may include a VoLTE call, a video call, a video streaming session, a video conference session, a VoNR, and a data session. Examples of the data session may include, but are not limited to, multimedia streaming, file transfer, content download, and file uploading. In an example, as soon as the application request is sent to the network, the initiation of the network service is detected.

In an example, a user seeking to avail the network service may access a corresponding application on the UE and accordingly, may cause sending of an application request to the network using the application. This sending of the application request may be understood by the UE as the commencement of the network service, in a non-limiting example. As mentioned above, the UE may operate in the ENDC mode, i.e., the UE may be connected to or may be operable to connect to both, an LTE cell, and a NR cell. Accordingly, the network service may be availed using a first RAT, which may be either NR or LTE. In an example, the network service may be availed using the NR cell, for example, in the case of the data session. In an example, the network service may be availed using the LTE cell, for example, in the case of VoLTE call. Accordingly, the application request may be sent to a network based on the type of network service. For instance, in the case of VoLTE call, the application request may be sent to an NR network. In another case of availing multimedia service over NR, the application request may be sent to NR network.

At step 204, the method 200 comprises detecting, during the ongoing network service being availed using the first RAT, a frequency of one or more NR network procedures being performed by the UE to be greater than a first threshold frequency. As mentioned above, owing to various reasons, the UE may perform NR network procedures, such as NR addition and NR removal. In an example, the frequency of one or more NR network procedures may include the number of times the NR cell is added and removed. More particularly, the frequency of the one or more NR network procedures may include the number of times NR cell is added and removed in a given unit time. As an example, consider the case of NR ping pong condition. In said case, the number of times NR addition and removal occurs in a preset time duration may define the frequency of the one or more NR network procedures.

In an example, the first threshold frequency may be a frequency value of NR network procedures beyond which the quality of service (QoS) of the network service may be degraded to a level that affects the network service.

In operation, during the ongoing network service, the frequency of NR network procedures may be monitored and accordingly it may be detected whether the frequency of the NR network procedures has exceeded the first threshold frequency or not. In particular, a delay period associated with the network service may be identified. In an example, the delay period may be defined by the network side based on a specification or based on an application from which the network service is requested. In an example, the delay period is indicative of an acceptable time delay between two consecutively received data packets associated with the network service. The method 200 may further include identifying the first threshold frequency associated with the NR network procedures. In a non-limiting example, in addition to the above definition of the first threshold frequency, the first threshold frequency may be further understood as a frequency of the NR network procedures at which a time delay between the two consecutively received data packets associated with the network service becomes greater than the delay period. After identifying the delay period and the first threshold frequency, the method 200 may include determining a current frequency of the NR network procedures and comparing the determined current frequency of the NR network procedures with the with the first threshold frequency to detect whether the current frequency of the NR network procedures is greater than the first threshold frequency or not.

Accordingly, when the frequency of the NR network procedures becomes more than the first threshold frequency, the same may be detected and recorded as one instance. Accordingly, all the instances of the frequency of the NR network procedures becoming being greater than the first threshold frequency may be recorded.

In an example embodiment, the first threshold frequency may be defined based on a threshold number of NR network procedures and a threshold time period. In an example, the values of the threshold number of NR network procedures and the threshold time period are so determined that the time delay between the two consecutively received data packets associated with the network service is less than the delay period. In an example, the threshold number of network measurements and the threshold time period may be defined based on at least one of a plurality of network parameters. Herein, the network parameter comprises a B1 threshold configured by the network, beam RSRP, beam RSRQ, SINR, a path loss value, a Tx of the UE, a MTPL of the UE, and a loss function defined based on the current frequency of the interference and the pre-determined threshold frequency. In an example, the plurality of parameters constitutes the network conditions and accordingly, a frequency of the NR network procedures for which no loss in QoS may occur may be determined.

In an example, the method 200 may further include dynamically modifying the first threshold frequency. In said example, the method 200 comprises calculating a loss function based on a current frequency of the NR procedures and the first threshold frequency. Furthermore, the method 200 comprises modifying the first threshold frequency based on the loss function. In an example, the modification comprises one of increasing and decreasing the first threshold frequency based on the loss function.

In an example embodiment, for modifying the first threshold frequency, the method 200 may include monitoring a current value of each of the plurality of network parameters, for the entire duration of the network service. Accordingly, the method 200 may further include determining a real-time value of the threshold number of NR network procedures and a real-time value of the threshold time period based on the monitored current value of each of the plurality of network parameters. Furthermore, the method 200 may include calculating the loss function.

In an example, the loss function may be defined by a current value of the frequency of NR network procedures and a current value of the first threshold frequency. Herein, the current value of the first threshold frequency is based on the determined real-time value of the threshold number of NR network procedures and the determined real-time value of the threshold time period. In other words, as per the current network conditions, a permissible number of NR network procedures that may be performed in a given time, that does not affect the network service may be determined. In an example, if the current frequency of NR network procedures is less than the first threshold frequency and still the QoS of the network service is degraded or an interference is observed, for example, a delay is observed, then the loss function would be negative. In vice versa case, the loss function would be positive. Accordingly, based on the loss function, the threshold frequency may be adjusted in the method 200. For instance, if the loss function is negative, either the threshold number of NR network procedures may be decreased, or the threshold time period may be increased.

As mentioned above, when the frequency of the NR network procedures becomes more than the first threshold frequency, the same may be detected and recorded as one instance. Accordingly, all the instances of the frequency of the NR network procedures becoming being greater than the first threshold frequency may be recorded. In an example embodiment, the method 200 may include sending a message indicative of non-support of NR to the network when a number of instances exceeds a threshold number of instances. Furthermore, in an example if the first RAT is LTE, the method 200 may include, continuing the network service using the first RAT. In another example, if the first RAT is NR, the method 200 may include terminating the connection to the NR and continuing the network service over LTE.

At step 206, the method 200 comprises modifying a measurement interval associated with an NR cell measurement procedure, in response to detecting the frequency of the NR network procedures to be greater than the first threshold frequency. In an example, the NR cell measurement procedure may be understood as a procedure in which the UE scans for NR frequencies.

In an example embodiment, the modifying of the measurement interval may include, increasing a current value of the measurement interval by a pre-set time value for each instance of the frequency of the one or more NR network procedures crossing the first threshold frequency. As mentioned above, each instance of the one or more NR network procedures crossing the first threshold frequency is recorded. In an example, the step of modifying may be performed based on the following equation.

In one embodiment, a new measurement interval=$T+k \cdot dt$ is provided. In such embodiment, T is the initial value of the measurement interval, k is the no. of instance recorded, and dt is the preset time value by which the measurement interval is to be increased.

In an example, consider that the UE may perform NR cell measurements, say, after every five milliseconds and the preset time value may be once milliseconds. Therefore, for every instance where the frequency of NR ping pong is found to be greater than first threshold frequency, the measurement interval may be increased by one milliseconds. Suppose in an example, the UE records 3 instance. In said example, the time gap would increase by 3 milliseconds and would now become 8 milliseconds.

By adjusting the measurement interval, frequency of the interference may be reduced. As a result, the pre-defined threshold frequency may not be crossed. This, in turn, helps in maintaining the QoS associated with the network service.

At step 208, the method 200 comprises continuing the network service as per the first RAT.

According to an embodiment, the method 200 may further include determining a current location of the UE. In an example, the determination of the current location may be done using known techniques like GPS positioning, Wi-Fi localization, using one or more suitable components of the UE. Subsequent to the determining of the current location, the method 200 may include ascertaining whether an identifier of the determined location is present in a location database. In an example, the location database comprises one or more identifiers corresponding to one or more locations where at least one of the UE and one or more other UEs have experienced interference in the network service due to the frequency of the one or more NR network procedures. In an example, the identifier may be a location ID, a geographical coordinate, etc. In an example, the location database may be stored in at least one of the UE and a network node. In an example, the network node may be a base station, such as the base station 110.

In an example, if it is ascertained that the location identifier corresponding to the determined location is not present in the location database, the method 200 may further include storing the identifier associated with the determined location in the location database.

According to an embodiment of the present disclosure, the method 200 includes optimizing the service delivery based on the location of the UE. In said example embodiment, the method 200 includes determining whether a current location of the UE is an interference location or not. An interference location may be understood as a location where the network service may experience interference due to the NR network procedures performed by the UE. In an example, the determination of whether the current location is an interference location may be done based on the location database.

In another example, the determination may be done based on historic measurement data associated with the current location and a plurality of network parameters. In an example, the historic measurement data comprises previously recorded frequency of NR procedures performed by at least one of the UE or one or more other UEs at the current location. In an example, the measurement data may be stored on the UE. In another example, the UE may obtain the measurement data from a network node, for example, a base station, such as the base station 110. In an example, the plurality of network parameters at the current location of the UE. The plurality of network parameters comprises a B1 threshold configured by the network, beam RSRP, beam RSRQ, SINR, a path loss value, a Tx of the UE, and a MTPL of the UE.

In an example, the determination of whether the current location is an interference location using the historic measurement data and the plurality of network parameters, may include providing the aforementioned as input to a learnt model. In an example, the learnt model may be a machine learning technique based learnt model that is configured to classify a location as one of an interference location. In another example, other known techniques may be used for classifying or determining the current location as the interference location.

Continuing with the above embodiment, where the location is determined to be the interference location, the method 200 may include sending a message indicative of non-support of NR to the network. In an example, the message may be a tracking area update (TAU) message or an attach message. In response to sending this message, the network is made aware that the UE is not capable of NR communication. Accordingly, the network does not trigger any NR cell measurements or other NR procedures for the UE. Thus, since no trigger is received by the UE, the UE does not perform any network measurements that may interfere with the network service. Furthermore, in an example if the first RAT is LTE, the method 200 may include, continuing the network service using the first RAT. In another example, if the first RAT is NR, the method 200 may include terminating the connection to the NR and continuing the network service over LTE.

In an embodiment, the method 200 further includes detecting a change in the current location of the UE. The method 200 further includes determining the changed location of the UE is a non-interference location based on at least one of: the location database, the historic measurement data, and the plurality of network parameters. A non-interference location may be understood as a location where the network service does not experience interference due to the NR network procedures performed by the UE. Accordingly, upon determining that the current location of the UE is the non-interference location, the method 200 includes sending, by the UE, a request to the network to connect to the NR cell.

In an example embodiment, the method 200 further includes monitoring a status of the network service. In an example, the status of the network service may indicate whether the network service is active or not active. In said example embodiment, the method 200 further includes detecting completion of the network service based on the monitored status of the network service. That is, when the status indicates that the service is not active, the UE determines that the network service is completed. Accordingly, the method 200 further includes sending a request to the network connect to the NR cell upon detecting the completion of the network service. In an example, the request may be sent to the base station to which the UE is connected.

Figure 3:
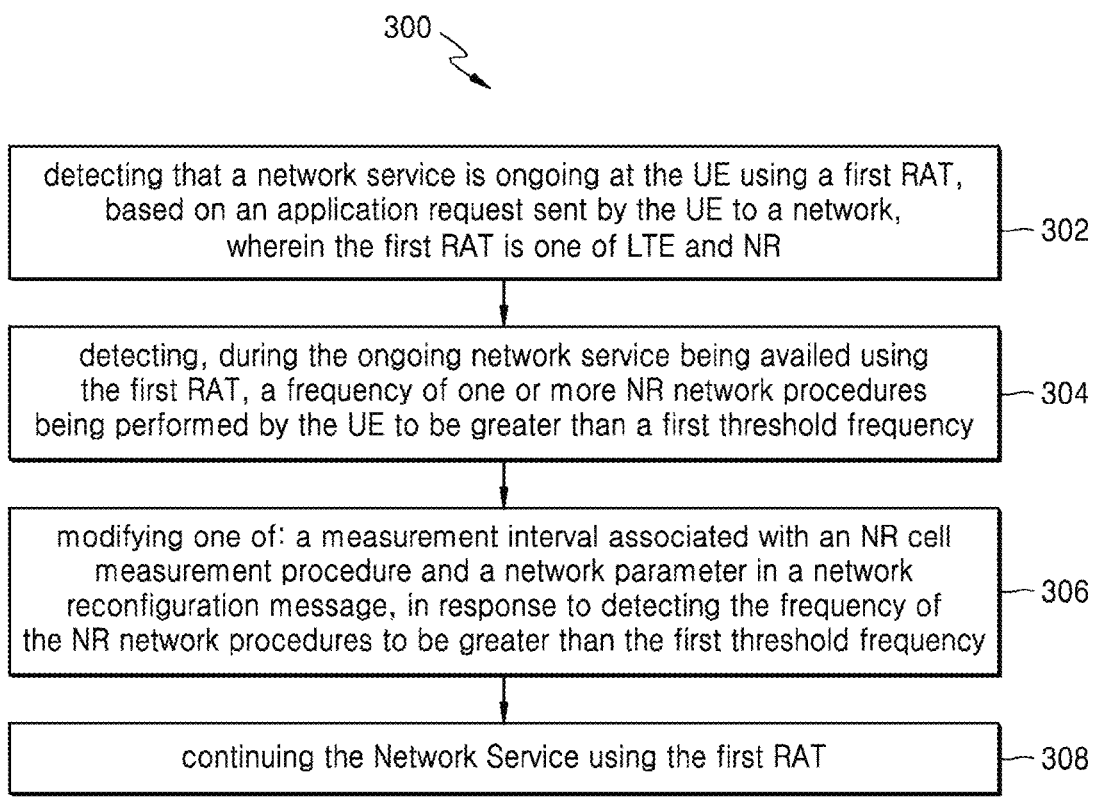
FIG. 3 illustrates a flowchart of a method of optimizing service delivery at a UE operating in an EN-DC mode according to an embodiment of the present disclosure.

FIG. 3 illustrates a method 300 of optimizing service delivery at a UE, such as the terminal 120 or 130, operating in an EN-DC mode, according to an embodiment of the present disclosure. In an example, aspects of the method 300, as described herein, may be implemented by one or more components of a base station, such as the base station 110, as illustrated and described in FIG. 5. The aspects described herein, may be implemented with the support or involvement of other network nodes as well.

At step 302, the method 300 comprises detecting that a network service is ongoing at the UE using a first RAT, based on an application request sent to a network by the UE. In an example, the network service may include a VoLTE call, a video call, a video streaming session, a video conference session, a VoNR, and a data session. Examples of the data session may include, but are not limited to, multimedia streaming, file transfer, content download, and file uploading. In an example, as soon as the application request is sent to the network, the initiation of the network service is detected.

In an example, a user seeking to avail the network service may access a corresponding application on the UE and accordingly, may cause sending of an application request to the network using the application. This sending of the application request may be understood by the UE as the commencement of the network service, in a non-limiting example. As mentioned above, the UE may operate in the ENDC mode, i.e., the UE may be connected to or may be operable to connect to both, an LTE cell, and a NR cell. Accordingly, the network service may be availed using a first RAT, which may be either NR or LTE. In an example, the network service may be availed using the NR cell, for example, in the case of the data session. In an example, the network service may be availed using the LTE cell, for example, in the case of VoLTE call. Accordingly, the application request may be sent to a network based on the type of network service. For instance, in the case of VoLTE call, the application request may be sent to an NR network. In another case of availing multimedia service over NR, the application request may be sent to NR network.

At step 304, the method 300 comprises detecting, during the ongoing network service being availed using the first RAT, a frequency of one or more NR network procedures being performed by the UE to be greater than a first threshold frequency. As mentioned above, owing to various reasons, the UE may perform NR network procedures, such as NR addition and NR removal. In an example, the frequency of one or more NR network procedures may include the number of times the NR cell is added and removed. More particularly, the frequency of the one or more NR network procedures may include the number of times NR cell is added and removed in a given unit time. As an example, consider the case of NR ping pong condition. In said case, the number of times NR addition and removal occurs in a preset time duration may define the frequency of the one or more NR network procedures.

In an example, the first threshold frequency may be a frequency value of NR network procedures beyond which the QoS of the network service may be degraded to a level that affects the network service.

In operation, during the ongoing network service, the frequency of NR network procedures may be monitored and accordingly it may be detected whether the frequency of the NR network procedures has exceeded the first threshold frequency or not, as explained above in step 204.

In an example embodiment, the first threshold frequency may be defined based on a threshold number of NR network procedures and a threshold time period, as explained above in step 204. In an example, the method 300 may further include dynamically modifying the first threshold frequency, as explained above in step 204.

As mentioned above, when the frequency of the NR network procedures becomes more than the first threshold frequency, the same may be detected and recorded as one instance. Accordingly, all the instances of the frequency of the NR network procedures becoming being greater than the first threshold frequency may be recorded. In an example embodiment, the method 300 may include sending a message indicative of non-support of NR to the network when a number of instances exceeds a threshold number of instances. Furthermore, in an example if the first RAT is LTE, the method 300 may include, continuing the network service using the first RAT. In another example, if the first RAT is NR, the method 300 may include terminating the connection to the NR and continuing the network service over LTE.

At step 306, the method 200 comprises modifying one of: a measurement interval associated with an NR cell measurement procedure and a network parameter in a network reconfiguration message, in response to detecting the frequency of the NR network procedures to be greater than the first threshold frequency. In an example embodiment, the modifying of the measurement interval may be performed as explained above in step 206

In an example embodiment, the network reconfiguration message may be an RRC configuration message. In said example, the network parameter may be B1 threshold. Herein, the method 300 may further include, increasing the B1 threshold by a pre-set value for each instance of the frequency of the one or more NR network procedures crossing the first threshold frequency. As an example, referring to the interference of the NR ping pong condition, the base station may increase x dbm offset of B1 Threshold parameter to avoid frequent NR addition/release when the frequency of the interference crosses the threshold frequency. For example, if previous B1 Threshold configured by NW was −120 dbm, on identifying VoLTE mute Network may increase B1 Threshold by say 5 dbm. So current B1 Threshold may be (−120+5) dbm, i.e., −115 dbm. This may reduce the NR ping pong frequency as UE may send measurement Report at relatively stronger NR region.

At step 308, the method 300 comprises continuing the network service as per a pre-defined QoS. Herein, in an example, the pre-defined QoS may be a QoS defined as per a specification of a radio access technology being used by the UE.

According to an embodiment, the method 300 may further include determining a current location of the UE. In an example, the determination of the current location may be done using known techniques like GPS positioning, Wi-Fi localization, using one or more suitable components of the UE. Subsequent to the determining of the current location, the method 300 may include ascertaining whether an identifier of the determined location is present in a location database. In an example, the location database comprises one or more identifiers corresponding to one or more locations where at least one of the UE and one or more other UEs have experienced interference in the network service due to the frequency of the one or more NR network procedures. In an example, the identifier may be a location ID, a geographical coordinate, etc. In an example, the location database may be stored in at least one of the UE and a network node. In an example, the network node may be a base station, such as the base station 110.

In an example, if it is ascertained that the location identifier corresponding to the determined location is not present in the location database, the method 300 may further include storing the identifier associated with the determined location in the location database.

According to an embodiment of the present disclosure, the method 300 includes optimizing the service delivery based on the location of the UE. In said example embodiment, the method 300 includes determining whether a current location of the UE is an interference location or not. In an example, the determination of whether the current location is an interference location may be done based on the location database.

In another example, the determination may be done based on historic measurement data associated with the current location and a plurality of network parameters, as explained above in the description of FIG. 2.

Continuing with the above embodiment, where the location is determined to be the interference location, the method 300 may include the method 300 further incudes terminating one or more NR bearers established between the UE and the network. Furthermore, in an example if the first RAT is LTE, the method 300 may include, continuing the network service using the first RAT. In another example, if the first RAT is NR, the method 300 may include terminating the connection to the NR and continuing the network service over LTE.

In an embodiment, the method 300 further includes detecting a change in the current location of the UE. The method 300 further includes determining the changed location of the UE is a non-interference location based on at least one of: the location database, the historic measurement data, and the plurality of network parameters. A non-interference location may be understood as a location where the network service does not experience interference due to the NR network procedures performed by the UE. Accordingly, upon determining that the current location of the UE is the non-interference location, the method 300 includes re-establishing the one or more NR bearers with the UE, in response to determining that the changed location to be the non-interference location.

In an example embodiment, the method 300 further includes monitoring a status of the network service. In an example, the status of the network service may indicate whether the network service is active or not active. In said example embodiment, the method 300 further includes detecting completion of the network service based on the monitored status of the network service. That is, when the status indicates that the service is not active, the UE determines that the network service is completed. Accordingly, the method 300 further includes re-establishing the one or more NR bearers with the UE, in response to determining that the changed location to be the non-interference location.

Figure 4:
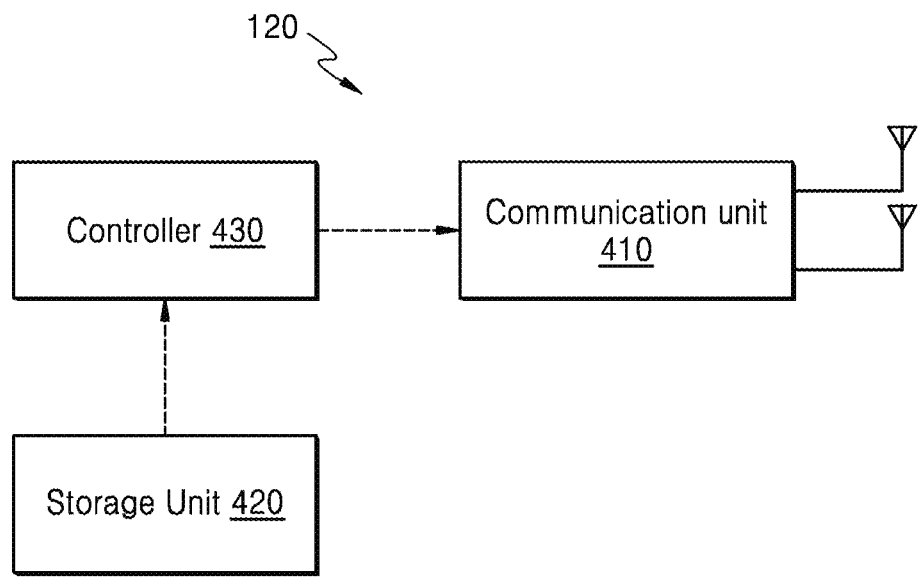
FIG. 4 illustrates a schematic block diagram of a UE according to an embodiment of the present disclosure.

FIG. 4 is a diagram illustrating the configuration of a terminal 120 in a wireless communication system according to an embodiment. The configuration of FIG. 4 may be understood as a part of the configuration of the terminal 120. Hereinafter, it is understood that terms including "unit" or "er" at the end may refer to the unit for processing at least one function or operation and may be implemented in hardware, software, or a combination of hardware and software.

Referring to FIG. 4, the terminal 120 may include a communication unit 410 (e.g., communicator or communication interface), a storage unit 420 (e.g., storage), and a controller 430 (e.g., at least one processor). By way of example, the terminal 120 may be a User Equipment, such as a cellular phone or other device that communicates over a cellular network (such as a 5G or pre-5G network or any future wireless communication network).

The communication unit 410 may perform functions for transmitting and receiving signals via a wireless channel. For example, the communication unit 410 performs a function of conversion between a baseband signal and a bit stream according to the physical layer standard of a system. By way of further example, when data is transmitted, the communication unit 410 generates complex symbols by encoding and modulating a transmission bit stream. Similarly, when data is received, the communication unit 410 restores a reception bit stream by demodulating and decoding a baseband signal. Furthermore, the communication unit 410 up-converts a baseband signal into an RF band signal and transmits the same via an antenna, and down-converts an RF band signal received via an antenna into a baseband signal. For example, the communication unit 410 may include at least one of a transmission filter, a reception filter, an amplifier, a mixer, an oscillator, a digital-to-analog converting (DAC), an analog-to-digital converting (ADC), and the like.

Also, the communication unit 410 may include or utilize a plurality of transmission and reception paths. In addition, the communication unit 410 may include at least one antenna array including a plurality of antenna elements. From the perspective of hardware, the communication unit 410 may include a digital circuit and an analog circuit (e.g., a radio frequency integrated circuit (RFIC)). Here, the digital circuit and the analog circuit may be implemented as one package. Also, the communication unit 410 may include a plurality of RF chains. In addition, the communication unit 410 may perform beamforming.

The communication unit 410 may transmit and receive a signal as described above. Accordingly, the entirety or a part of the communication unit 310 may be referred to as "transmitting unit," "receiving unit," "transceiving unit," "transmitter," "receiver," or "transceiver." Also, the transmission and reception performed via a wireless channel, which is described hereinbelow, may include the above-described processing performed by the communication unit 410.

The storage unit 420 may store data, such as a basic program, an application program, configuration information, and the like for operating the terminal 120. The storage unit 420 may be configured as a volatile memory, a non-volatile memory, or a combination of a volatile memory and a non-volatile memory. In addition, the storage unit 420 may provide data stored therein in response to a request from the controller 430.

The controller 430 may control overall operations of the terminal 120. For example, the controller 430 may transmit and receive a signal via the communication unit 410. Further, the controller 430 records data in the storage unit 420 and reads the recorded data. The controller 430 may perform the functions of a protocol stack required by a particular communication standard. To this end, the controller 430 may include at least one processor or micro-processor, or may be a part of the processor. Also, a part of the communication unit 410 and the controller 430 may be referred to as a communication processor (CP).

According to an embodiment, the controller 430 may perform control such that a User Equipment or a terminal performs operations according to one or more embodiments described above. For the sake of brevity, details of the embodiments that have been already described above are not described in detail herein.

In an example embodiment, the controller 430 may be configured to detect that a network service is ongoing at the UE using a first RAT, based on an application request sent by the UE to a network. Herein, the first RAT is one of LTE and NR. Furthermore, the controller 430 may be configured to detect, during the ongoing network service being availed using the first RAT, a frequency of one or more NR network procedures being performed by the UE to be greater than a first threshold frequency. Furthermore, the controller 430 may be configured to modify a measurement interval associated with an NR cell measurement procedure, in response to detecting the frequency of the NR network procedures to be greater than the first threshold frequency. Furthermore, the controller 430 may be configured to continue the Network Service using the first RAT.

In an example embodiment, for modifying of the measurement interval comprises, the controller 430 may be further configured to increase a current value of the measurement interval by a pre-set time value for each instance of the frequency of the one or more NR network procedures crossing the first threshold frequency.

In an example embodiment, the controller 430 may be further configured to: send a message indicative of non-support of NR to the network when a number of instances exceeds a threshold number of instances. Furthermore, the controller 430 may be configured to continue the network service using the first RAT, if the first RAT is LTE. Furthermore, the controller 430 may be configured to terminate the connection to the NR and continuing the network service over LTE if the first RAT is NR.

In an example embodiment, the controller 430 may be further configured to determine a current location. Furthermore, the controller 430 may be configured to ascertain whether an identifier of the determined location is present in a location database comprising of one or more identifiers corresponding to one or more locations where at least one of the UE and one or more other UEs have experienced interference in the network service due to the frequency of the one or more NR network procedures. In an example, the location database is stored in at least one of the UE and a network node. Furthermore, the controller 430 may be configured to store the identifier associated with the determined location in the location database, if it is ascertained that the location identifier corresponding to the determined location is not present in the location database.

In an example embodiment, the controller 430 may be further configured to determine a current location of the UE to be an interference location based on at least one of a location database, historic measurement data, and a plurality of network parameters. The location database comprises information associated with one or more locations where at least one of the UE and one or more other UEs have experienced interference in the network service due to the frequency of the one or more NR network procedures. In an example, the location database is stored in at least one of the UE and a network node. The historic measurement data associated with the determined current location comprises previously recorded frequency of NR procedures performed by at least one of the UE or one or more other UEs at the current location. The plurality of network parameters comprises a B1 threshold configured by the network, beam RSRP, beam RSRQ, SINR, a path loss value, a Tx of the UE, and a MTPL of the UE. Furthermore, the controller 430 may be configured to sending a message indicative of non-support of the NR to the network, in response to the current location being determined as an interference location. Furthermore, the controller 430 may be configured to continue the network service using the first RAT, if the first RAT is LTE. Furthermore, the controller 430 may be configured to terminate the connection to the NR and continue the network service over LTE, if the first RAT is NR.

In an example embodiment, the message indicative of non-support of the NR cell comprises one of a TAU message and an attach message.

In an example embodiment, the controller 430 may be further configured to detect a change in the current location of the UE. Furthermore, the controller 430 may be configured to determine the changed location of the UE to be a non-interference location based on at least one of: the location database, the historic measurement data, and the plurality of network parameters. Furthermore, the controller 430 may be configured to send a request to the network to connect to the NR, in response to determining that the changed location is the non-interference location.

In an example embodiment, the controller 430 may be further configured to monitor a status of the network service. Furthermore, the controller 430 may be configured to detect completion of the network service based on the monitored status of the network service. Furthermore, the controller 430 may be configured to send a request to the network to connect to the NR cell upon detecting the completion of the network service.

In an example, the network service comprises at least one of a VoLTE, a video call, a video streaming session, a VoNR, a video conference session, and a data session.

In an example, the one or more NR network procedure comprises at least one of an NR addition and an NR removal, and the frequency of network procedure comprises of the number of times the NR cell is added and removed.

In an example, the controller 430 may be further configured to calculate a loss function based on a current frequency of the NR procedures and the first threshold frequency. Furthermore, the controller 430 may be configured to modify the first threshold frequency based on the loss function, wherein the modification comprises one of increasing and decreasing the first threshold frequency.

Figure 5:
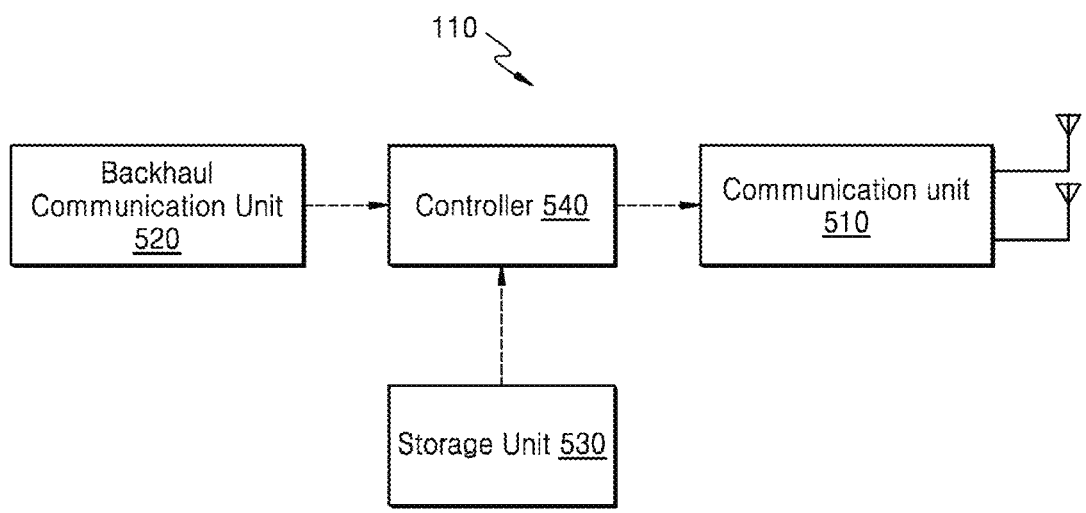
FIG. 5 illustrates a schematic block diagram of a base station according to an embodiment of the present disclosure.

FIG. 5 is a diagram illustrating the configuration of a base station 110 in a wireless communication system according to an embodiment. The configuration of FIG. 5 may be understood as a part of the configuration of the base station 110. Hereinafter, it is understood that terms including "unit" or "er" at the end may refer to the unit for processing at least one function or operation and may be implemented in hardware, software, or a combination of hardware and software.

Referring to FIG. 5, the base station 110 may include a wireless communication unit 510 (e.g., wireless communicator or wireless communication interface), a backhaul communication unit 520 (e.g., backhaul communicator or backhaul communication interface), a storage unit 530 (e.g., storage), and a controller 540 (e.g., at least one processing device).

The wireless communication unit 510 executes functions for transmitting and receiving signals via a wireless channel. For example, the wireless communication unit 510 performs a function of conversion between a baseband signal and a bit stream according to the physical layer standard of a system. By way of further example, when data is transmitted, the wireless communication unit 510 generates complex symbols by encoding and modulating a transmission bit stream. Similarly, when data is received, the wireless communication unit 510 restores a reception bit stream by demodulating and decoding a baseband signal. Furthermore, the wireless communication unit 510 up-converts a baseband signal into a radio-frequency (RF) band signal and transmits the same via an antenna, and down-converts an RF band signal received via an antenna into a baseband signal.

For example, the wireless communication unit 510 may include a transmission filter, a reception filter, an amplifier, a mixer, an oscillator, a DAC, an ADC, and the like. Also, the wireless communication unit 510 may include or utilize a plurality of transmission and reception paths. Furthermore, the wireless communication unit 510 may include at least one antenna array including a plurality of antenna elements. From the perspective of hardware, the wireless communication unit 510 may include a digital unit and an analog unit, and the analog unit may include a plurality of sub-units on the basis of an operating power, an operating frequency, or the like.

The wireless communication unit 510 may transmit and receive a signal as described above. Accordingly, the entirety or a part of the wireless communication unit 510 may be referred to as "transmitting unit," "receiving unit," "transceiving unit," "transmitter," "receiver," or "transceiver." Also, the transmission and reception performed via the wireless channel, which is described hereinbelow, may include the above-described processing performed by the wireless communication unit 510.

The backhaul communication unit 520 provides an interface for performing communication with other nodes within the network. That is, the backhaul communication unit 520 converts a bit stream that is transmitted from the base station 110 to another node, for example, another access node, another base station, an upper node, a core network or the like, into a physical signal, and converts a physical signal received from another node into a bit stream.

The storage unit 530 may store data, such as a basic program, an application program, configuration information, and the like for operating the base station 110. The storage unit 530 may be configured as a volatile memory, a non-volatile memory, or a combination of a volatile memory and a non-volatile memory. In addition, the storage unit 530 may provide data stored therein in response to a request from the controller 540.

The controller 540 may control overall operations of the base station 110. For example, the controller 540 may transmit and receive signals via the wireless communication unit 510 or the backhaul communication unit 520. Further, the controller 540 records data in the storage unit 530 and reads the recorded data. The controller 540 may perform the functions of a protocol stack required by a particular communication standard. To this end, the controller 540 may include at least one processor.

According to an embodiment, the controller 540 may perform control such that a base station, such as the base station 110, either alone or in conjunction with other network nodes, or any other network node, performs operations according to one or more embodiments described above. For the sake of brevity, details of the embodiments that have been already described above are not described in detail herein.

In an example embodiment, the controller 540 may be configured to detect that a network service is ongoing at the UE using a first RAT, based on an application request sent by the UE to a network. Herein, the first RAT is one of LTE and NR. Furthermore, the controller 540 may be configured to detect, during the ongoing network service being availed using the first RAT, a frequency of one or more NR network procedures being performed by the UE to be greater than a first threshold frequency. Furthermore, the controller 540 may be configured to modify one of: a measurement interval associated with an NR cell measurement procedure and a network parameter in a network reconfiguration message, in response to detecting the frequency of the NR network procedures to be greater than the first threshold frequency. Furthermore, the controller 540 may be configured to continue the Network Service using the first RAT.

In an example embodiment, wherein the network parameter is B1 threshold, the controller 540 is further configured to increase the B1 threshold by a pre-set value for each instance of the frequency of the one or more NR network procedures crossing the first threshold frequency.

In an example embodiment, for modifying of the measurement interval comprises, the controller 540 may be further configured to increase a current value of the measurement interval by a pre-set time value for each instance of the frequency of the one or more NR network procedures crossing the first threshold frequency.

In an example embodiment, the controller 540 may be further configured to terminate one or more NR bearers established between the UE and the network, when a number of the instances exceeds a threshold number. Furthermore, the controller 540 may be configured to continue the network service using the first RAT, if the first RAT is LTE. Furthermore, the controller 540 may be configured to continue the network service over LTE if the first RAT is NR.

In an example embodiment, the controller 540 may be further configured to determine a current location. Furthermore, the controller 540 may be configured to ascertain whether an identifier of the determined location is present in a location database comprising of one or more identifiers corresponding to one or more locations where at least one of the UE and one or more other UEs have experienced interference in the network service due to the frequency of the one or more NR network procedures. In an example, the location database is stored in at least one of the UE and a network node. Furthermore, the controller 540 may be configured to store the identifier associated with the determined location in the location database, if it is ascertained that the location identifier corresponding to the determined location is not present in the location database.

In an example embodiment, the controller 540 may be further configured to determine a current location of the UE to be an interference location based on at least one of a location database, historic measurement data, and a plurality of network parameters. The location database comprises information associated with one or more locations where at least one of the UE and one or more other UEs have experienced interference in the network service due to the frequency of the one or more NR network procedures. In an example, the location database is stored in at least one of the UE and a network node. The historic measurement data associated with the determined current location comprises previously recorded frequency of NR procedures performed by at least one of the UE or one or more other UEs at the current location. The plurality of network parameters comprises a B1 threshold configured by the network, beam RSRP, beam RSRQ, SINR, a path loss value, a Tx of the UE, and a MTPL of the UE. Furthermore, the controller 540 may be configured to terminate one or more NR bearers established between the UE and the network, in response to the current location being determined as an interference location. Furthermore, the controller 540 may be configured to continue the network service using the first RAT, if the first RAT is LTE. Furthermore, the controller 540 may be configured to continue the network service over LTE, if the first RAT is NR.

In an example embodiment, the controller 540 may be further configured to detect a change in the current location of the UE. Furthermore, the controller 540 may be configured to determine the changed location of the UE to be a non-interference location based on at least one of: the location database, the historic measurement data, and the plurality of network parameters. Furthermore, the controller 540 may be configured to re-establish the one or more NR bearers with the UE, in response to determining that the changed location to be the non-interference location.

In an example embodiment, the controller 540 may be further configured to monitor a status of the network service. Furthermore, the controller 540 may be configured to detect completion of the network service based on the monitored status of the network service. Furthermore, the controller 540 may be configured to re-establish the one or more NR bearers with the UE, in response to determining that the changed location to be the non-interference location.

In an example, the network service comprises at least one of a VoLTE, a video call, a video streaming session, a VoNR, a video conference session, and a data session.

In an example, the one or more NR network procedure comprises at least one of an NR addition and an NR removal, and the frequency of network procedure comprises of the number of times the NR cell is added and removed.

In an example, the controller 540 may be further configured to calculate a loss function based on a current frequency of the NR procedures and the first threshold frequency. Furthermore, the controller 540 may be configured to modify the first threshold frequency based on the loss function, wherein the modification comprises one of increasing and decreasing the first threshold frequency.

Figure 6:
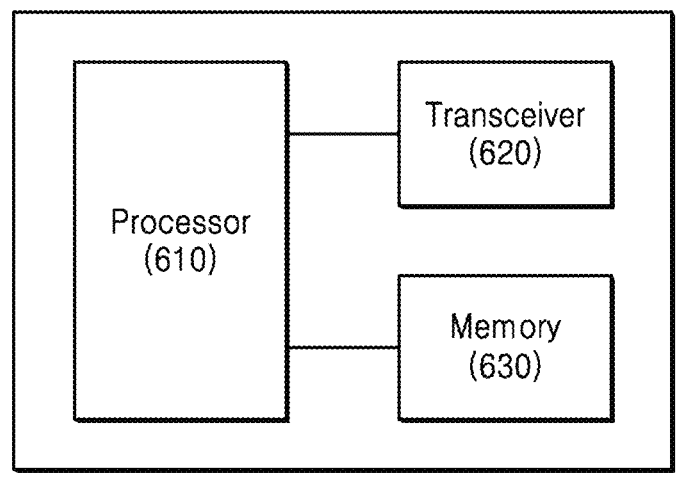
FIG. 6 illustrates a base station according to embodiments of the present disclosure.

FIG. 6 illustrates a base station according to embodiments of the present disclosure.

Referring to the FIG. 6, the base station 600 may include a processor 610, a transceiver 620 and a memory 630. However, all of the illustrated components are not essential. The base station 600 may be implemented by more or less components than those illustrated in FIG. 6. In addition, the processor 610 and the transceiver 620 and the memory 630 may be implemented as a single chip according to another embodiment.

The base station 600 may correspond to base station 110 described above. For example, the base station 600 may correspond to the base station 110 illustrated in FIG. 1 and FIG. 5. For example, the processor 610 may correspond to the controller 540 illustrated in FIG. 5 and the memory 630 may correspond to the storage 530 illustrated in FIG. 5.

The aforementioned components will now be described in detail.

The processor 610 may include one or more processors or other processing devices that control the proposed function, process, and/or method. Operation of the BASE STATION 600 may be implemented by the processor 610.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components. The transceiver 620 may include a communication unit 510 or a backhaul communication unit 520 illustrated in FIG. 5.

The transceiver 620 may be connected to the processor 610 and transmit and/or receive a signal. The signal may include control information and data. In addition, the transceiver 620 may receive the signal through a wired and wireless network and output the signal to the processor 610. The transceiver 620 may transmit a signal output from the processor 610 through the wireless channel.

The memory 630 may store the control information or the data included in a signal obtained by the base station 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

The embodiments disclosed herein can be implemented using at least one software program running on at least one hardware device and performing network management functions to control the elements.

Figure 7:
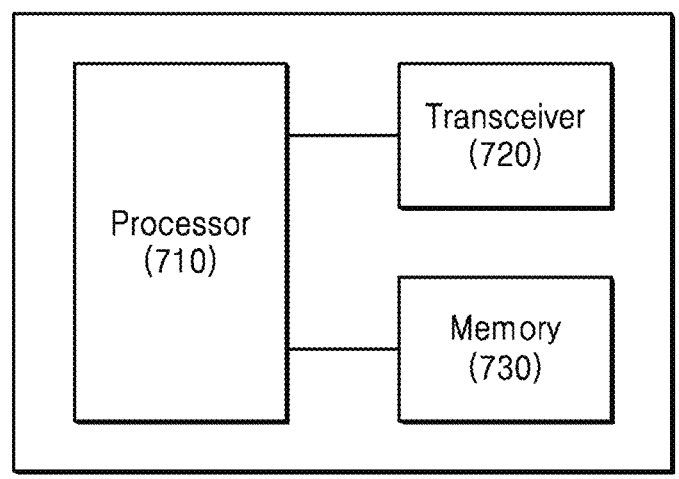
FIG. 7 illustrates a UE according to embodiments of the present disclosure.

FIG. 7 illustrates a UE according to embodiments of the present disclosure.

Referring to the FIG. 7, the UE 700 may include a processor 710, a transceiver 720 and a memory 730. However, all of the illustrated components are not essential. The UE 700 may be implemented by more or less components than those illustrated in FIG. 7. In addition, the processor 710 and the transceiver 720 and the memory 730 may be implemented as a single chip according to another embodiment.

The UE 700 may correspond to the UE described above. For example, UE 700 may correspond to UE 120 illustrated in FIG. 1 and FIG. 4. For example, the processor 710 may correspond to the controller 430 illustrated in FIG. 4, the transceiver 720 may correspond to the communication unit 410 illustrated in FIG. 4, and the memory 730 may correspond to the storage unit 420 illustrated in FIG. 4.

The aforementioned components will now be described in detail.

The processor 710 may include one or more processors or other processing devices that control the proposed function, process, and/or method. Operation of the UE 700 may be implemented by the processor 710.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the UE 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

While specific language has been used to describe the present disclosure, any limitations arising on account thereto, are not intended. As would be apparent to a person in the art, various working modifications may be made to the method to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

The invention claimed is:

1. A method of user equipment (UE) for optimizing service delivery in a wireless communication system, the method comprising:
    detecting, using a first radio access radio technology (RAT), a network service operating at the UE based on an application request transmitted to a network, wherein the first RAT is one of long-term evolution (LTE) or a new radio (NR);
    detecting, during the network service operating at the UE, a frequency of one or more NR network procedures being performed by the UE, wherein the frequency is greater than a first threshold frequency;

modifying a measurement interval associated with an NR cell measurement procedure in response to detecting that the frequency of the one or more NR network procedures is greater than the first threshold frequency; and maintaining the network service using the first RAT.

2. The method as claimed in claim 1, further comprising increasing a current value of the measurement interval by a value of a pre-set time for each of the frequency of the one or more NR network procedures exceeding the first threshold frequency.

3. The method as claimed in claim 2, further comprising:
sending, to the network, a message indicating a non-support of NR when a number of instances exceeds a threshold of a number of instances;
performing one of:
   maintaining the network service using the first RAT when the first RAT is the LTE; or
   terminating a connection with the NR and maintaining the network service over the LTE when the first RAT is the NR.

4. The method as claimed in claim 1, further comprising:
determining a current location of the UE;
determining whether an identifier of the determined current location of the UE is present in a location database comprising one or more identifiers corresponding to, respectively, one or more locations where at least one of the UE and one or more other UEs haave experienced interference in the network service due to the frequency of the one or more NR network procedures, wherein the location database is stored in at least one of the UE and a network node;
storing the identifier associated with the determined current location of the UE in the location database based on a determination that the identifier of the determined current location of the UE is not present in the location database;
determining whether the current location of the UE is an interference location or not, based on at least one of:
   the location database;
   historic measurement data associated with the determined current location of the UE, wherein the historic measurement data comprises previously recorded frequency of NR procedures performed by at least one of the UE or one or more other UEs at the current location; and
   a value of a plurality of network parameters at the current location of the UE, wherein the plurality of network parameters comprises a B1 threshold configured by the network, beam reference signal received power (RSRP), beam reference signal received quality (RSRQ), signal-to-interference-plus-noise ratio (SINR), a path loss value, a transmission power (Tx) of the UE, and a maximum transmit power level (MTPL) of the UE;
sending, to the network, a message indicating a non-support of the NR based on a determination that the current location of the UE is the interference location; and
performing one of:
   maintaining the network service using the first RAT when the first RAT is the LTE; or
   terminating a connection with the NR and maintaining the network service over the LTE when the first RAT is the NR.

5. The method as claimed in claim 4, further comprising:
detecting a change in the current location of the UE;
determining the changed location of the UE as a non-interference location based on at least one of the location database, the historic measurement data, and the value of the plurality of network parameters; and
sending a request to the network to connect to the NR in response to determining that the changed location of the UE is the non-interference location.

6. The method as claimed in claim 4, further comprising:
monitoring a status of the network service;
detecting a completion of the network service based on the monitored status of the network service; and
sending a request to the network to connect to the NR in response to detecting the completion of the network service.

7. The method as claimed in claim 1, further comprising:
calculating a loss function based on a current frequency of the NR procedures and the first threshold frequency; and
modifying, based on the loss function, the first threshold frequency by increasing or decreasing the first threshold frequency.

8. A user equipment (UE) for optimizing service delivery in a wireless communication system, the UE comprising:
a transceiver;
memory; and
a processor coupled to the transceiver and the memory, the processor configured to:
   detect, using a first radio access radio technology (RAT), a network service operating at the UE based on an application request transmitted to a network, wherein the first RAT is one of long-term evolution (LTE) and a new radio (NR);
   detect, during the network service operating at the UE, a frequency of one or more NR network procedures being performed by the UE, wherein the frequency is greater than a first threshold frequency;
   modify a measurement interval associated with an NR cell measurement procedure in response to detecting that the frequency of the one or more NR network procedures is greater than the first threshold frequency; and
   maintain the network service using the first RAT.

9. The UE as claimed in claim 8, wherein the processor is further configured to increase a current value of the measurement interval by a value of a pre-set time for each of the frequency of the one or more NR network procedures exceeding the first threshold frequency.

10. The UE as claimed in claim 9, wherein the processor is further configured to:
send, to the network, a message indicating a non-support of NR when a number of instances exceeds a threshold of a number of instances;
perform one of:
   maintaining the network service using the first RAT when the first RAT is the LTE; or
   terminating a connection with the NR and maintain the network service over the LTE when the first RAT is the NR.

11. The UE as claimed in claim 8, wherein the processor is further configured to:
determine a current location of the UE;
determine whether an identifier of the determined current location of the UE is present in a location database comprising one or more identifiers corresponding to, respectively, one or more locations where at least one of the UE and one or more other UEs have experienced interference in the network service due to the frequency of the one or more NR network procedures, wherein the location database is stored in at least one of the UE and a network node; and store the identifier associated with the determined current location of the UE in the location database based on a determination that the identifier of the determined current location of the UE is not present in the location database;

determine whether the current location of the UE is an interference location or not, based on at least one of:
   the location database;
   historic measurement data associated with the determined current location of the UE, wherein the historic measurement data comprises previously recorded frequency of NR procedures performed by at least one of the UE or one or more other UEs at the current location; or
   a value of a plurality of network parameters at the current location of the UE, wherein the plurality of network parameters comprises a B1 threshold configured by the network, beam reference signal received power (RSRP), beam reference signal received quality (RSRQ), signal-to-interference-plus-noise ratio (SINR), a path loss value, a transmission power (Tx) of the UE, and a maximum transmit power level (MTPL) of the UE;

send, to the network, a message indicating a non-support of the NR based on a determination that the current location of the UE is the interference location; and perform one of:
   maintaining the network service using the first RAT when first RAT is the LTE; or
   terminating a connection with the NR and maintaining the network service over the LTE when the first RAT is the NR.

12. The UE as claimed in claim 11, wherein the processor is further configured to:

detect a change in the current location of the UE;

determine the changed location of the UE as a non-interference location based on at least one of the location database, the historic measurement data, and the value of the plurality of network parameters; and send a request to the network to connect to the NR in response to determining that the changed location of the UE is the non-interference location.

13. The UE as claimed in claim 11, wherein the processor is further configured to:

monitor a status of the network service;

detect a completion of the network service based on the monitored status of the network service; and send a request to the network to connect to the NR in response to detecting the completion of the network service.

14. A method for optimizing service delivery by a base station in a wireless communication system, the method comprising:

detecting, using a first radio access radio technology (RAT), a network service operating at a user equipment (UE) based on an application request transmitted to a network, wherein the first RAT is one of long-term evolution (LTE) or a new radio (NR);

detecting, during the network service operating at the UE, a frequency of one or more NR network procedures being performed by the UE, wherein the frequency is greater than a first threshold frequency;

modifying a measurement interval associated with an NR cell measurement procedure in response to detecting that the frequency of the one or more NR network procedures is greater than the first threshold frequency; and maintaining the network service using the first RAT.

15. A base station for optimizing service delivery in a wireless communication system, the base station comprising:

a transceiver;

memory; and a processor coupled the transceiver and the memory, the processor configured to:

detect, using a first radio access radio technology (RAT), a network service operating at a user equipment (UE) based on an application request transmitted to a network, wherein the first RAT is one of long-term evolution (LTE) or a new radio (NR);

detect, during the network service operating at the UE, a frequency of one or more NR network procedures being performed by the UE, wherein the frequency is greater than a first threshold frequency;

modify a measurement interval associated with an NR cell measurement procedure in response to detecting that the frequency of the one or more NR network procedures is greater than the first threshold frequency; and maintain the network service using the first RAT.

\* \* \* \* \*